H. A. TUTTLE.
BAND BRAKE.
APPLICATION FILED JUNE 23, 1908.

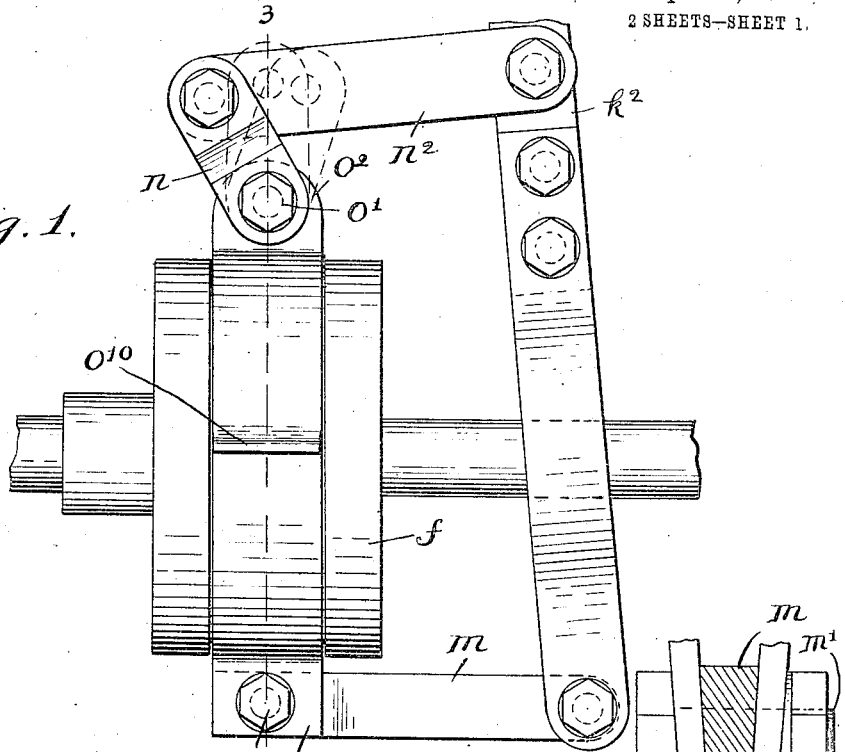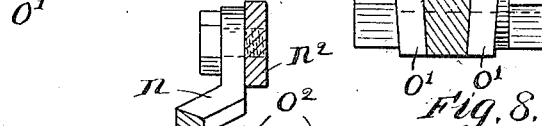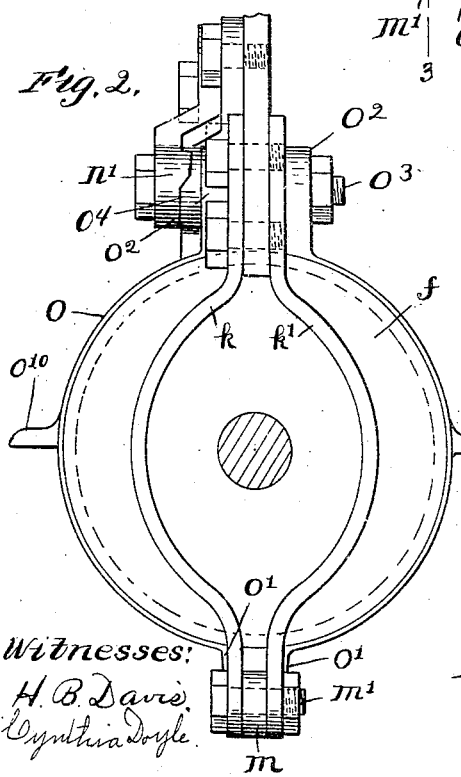

917,814.

Patented Apr. 13, 1909.
2 SHEETS—SHEET 2.

Witnesses:
H. B. Davis
Cynthia Doyle

Inventor:
Henry A. Tuttle
by Noyes & Harriman
attys.

UNITED STATES PATENT OFFICE.

HENRY A. TUTTLE, OF TAUNTON, MASSACHUSETTS, ASSIGNOR TO EVANS STAMPING & PLATING COMPANY, OF TAUNTON, MASSACHUSETTS, A CORPORATION.

BAND-BRAKE.

No. 917,814.  Specification of Letters Patent.  Patented April 13, 1909.

Application filed June 23, 1908. Serial No. 439,941.

*To all whom it may concern:*

Be it known that I, HENRY A. TUTTLE, of Taunton, county of Bristol, State of Massachusetts, have invented an Improvement in Band-Brakes, of which the following is a specification.

This invention relates to band brakes, and has for its object to construct a simple yet powerful brake, especially adapted for use in connection with transmission gearing, such for instance as represented in my application for Letters Patent Serial No. 390,566, filed August 29, 1907, yet it may be used for other purposes.

Figure 4:
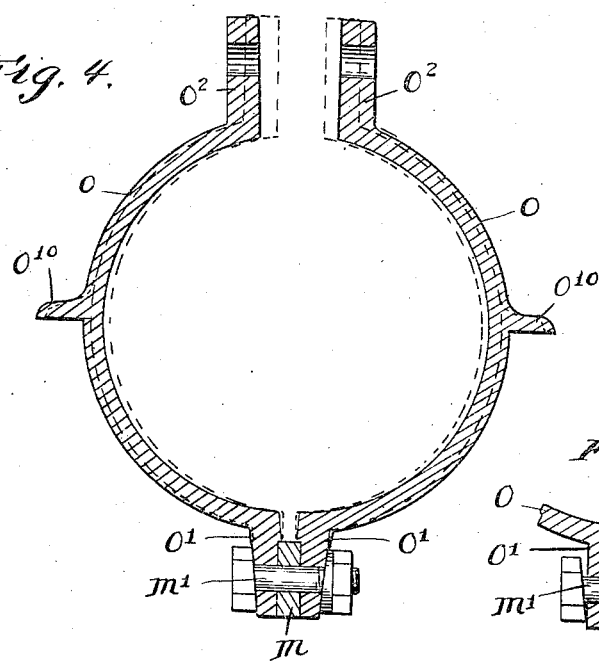
Figure 5:
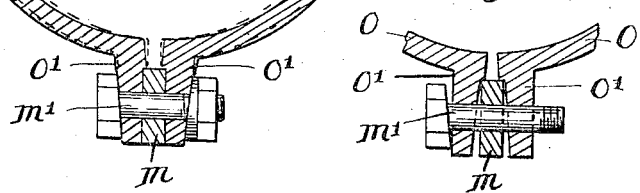
Figure 6:
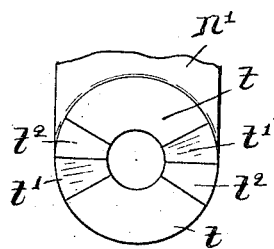
Figure 7:
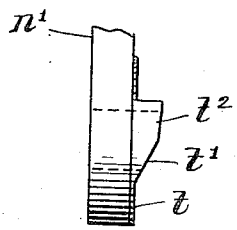

Figure 1 is a side elevation of a band brake embodying this invention. Fig. 2 is an end view of the band brake shown in Fig. 1. Fig. 3 is a vertical section of the band brake shown in Fig. 1, taken on the dotted line 3—3, the members of the brake occupying their engaging positions. Fig. 4 is a detail of the two brake members, the full lines showing the members in their disengaging position and the dotted lines in their engaging positions. Fig. 5 is a detail of said brake-members before the bolt connecting said members together is tightened. Figs. 6 and 7 are details of one of the cam-faced bosses, and, Fig. 8 is a modification to be referred to.

$f$ represents a cylindrical case or other object, adapted to be engaged by the band brake.

$o$, $o$, represent two semicircular members shaped to embrace the case, each member having at one end an ear $o'$, and at the opposite end an ear $o^2$, said ears all extending outwardly.

A flat bar $m$ is arranged horizontally beneath the case, one end of which is placed between the two ears $o'$, $o'$, and a bolt $m'$ passes through holes in said ears and bar, which holds them assembled, and also holds the bar in fixed position. The inner sides or faces of the ears $o'$, $o'$, which engage the bar $m$, are oppositely inclined, as shown in Figs. 3, 4 and 5, and the bar is formed with parallel sides or faces, and when the bolt $m'$ is passed through them and tightened, said ears are drawn into engagement with the bar, and by reason of the inclination which is given to the engaging faces of the ears, the opposite ends of the semicircular members are caused to separate from each other sufficiently to disengage the case and permit it to revolve freely. Or in lieu thereof the end of the bar $m$ may be formed with oppositely inclined sides or faces, see Fig. 8, or the whole bar may be thus constructed, and the inner sides or faces of the ears which engage said bar may be formed in parallelism, and as a result said ears are held at slight angles with respect to each other, being brought nearer together at their outer or lower ends. This likewise causes the opposite ends of the semicircular members to separate so as to disengage the case sufficiently to permit it to revolve freely. In both instances the two semicircular members are rigidly connected to the bar and are caused to diverge from said bar. Hence I do not desire to limit my invention to the particular means employed for engaging the ears $o'$, $o'$, to cause the opposite ends of the semicircular members to separate.

To cause the semicircular members to engage the case and restrain it from rotation they are drawn toward each other, and they are made inherently spring acting in order that this result may be accomplished. A bolt $o^3$ extends through holes in the ears $o^2$, $o^2$, which is made long enough to extend beyond one of the ears, to receive upon it an arm $n$ between its head and the adjacent ear. The arm $n$ has a cam-faced boss $n'$ which engages a cam-faced boss $o^4$ on the adjacent ear $o^2$, so that as the arm is turned on the bolt as an axis the ear which is engaged by said arm will be moved toward the opposite ear, and the bolt will be drawn longitudinally to thereby draw said opposite ear toward the first named ear. Thus the two ears are caused to approach each other and the two semicircular members $o$, $o$, are caused to engage the case. Movement of the arm $n$ in one direction causes the two semicircular members to engage the case and movement thereof in the opposite direction permits said members to disengage the case. By turning up the nut on the bolt the ears are adjusted relative to each other.

It is designed and intended that the arm $n$ shall occupy three different positions, see full and dotted lines Fig. 1, in order that the actuating lever $k^2$ to which it is connected, as hereinafter described, may be employed to operate the clutch-mechanism shown in my aforesaid application #390,566, and in two of these positions it shall not operate the band brake, but in the third it shall operate the band-brake. Furthermore, it is desirable when operating the band-brake, to provide a quick initial movement which may be followed by a slower movement. To accomplish these results the cam-faced boss on the ear and also on the arm are or may be made as shown in Figs. 6 and 7, wherein it will be seen that $t$ represents a depressed portion and $t'$ a quick rise of the cam, and $t^2$ a slow rise of the cam. When the arm $n$ is in its first and second positions see dotted lines Fig. 1, the portions $t'$ and $t^2$ on the arm occupy and move in the depressed portion $t$, of the boss on the ear, and when in its third position see full lines Fig. 1, said portions $t'$ and $t^2$ ride up on the corresponding portions of the boss on the ear. Hence the depressed portions are made of a length substantially twice as long as the combined length of the portions $t'$ and $t^2$. The inherent spring action of the two semicircular members is sufficient to permit them to be moved toward each other to engage the case by a movement of the arm $n$ in one direction, and to separate and thereby disengage the case when the arm is moved in the opposite direction.

To swing the arm $n$ for the purpose of operating the band brake it is herein shown as connected by a link $n^2$, with an actuating-lever $k^2$, it being bent at a point intermediate its length to enable this connection to be made. The actuating-lever $k^2$ is herein shown as rigidly connected at its lower end to the upper ends of a pair of bent bars $k, k'$, which are pivotally connected at their lower ends to the outer end of the aforesaid bar $m$. Hence the actuating-lever $k$ is pivotally connected to the bar $m$. The bars $k$ and $k'$ are bent in opposite ways, as shown, for the purpose of engaging the sliding member of a clutch-mechanism, not shown, but my invention is not limited to thus forming the actuating-lever.

The two semicircular members $o, o$, are herein shown as each having an outwardly extended lug $o^{10}$ which is adapted to engage a suitable support, to thereby prevent the band brake from turning with respect to the case whenever it is operated, and also for supporting the weight of the band-brake when the parts thereof are in their disengaging positions. By providing these lugs $o^{10}$ and arranging them as herein shown, one or both of them will be disengaged from its support when the members engage the case. but when said members disengage the case said lugs will move into engagement with their supports and will act to support the coöperative parts of the band-brake, so as to entirely relieve the case from performing this function. Otherwise the case would have to support the band-brake, and owing to the friction produced by the engagement of the case and band-brake, even when the parts of the band-brake are in their disengaging positions and merely rest on the case, it is a decided improvement to entirely avoid such engagement of the case and band-brake.

Having thus described my invention, what I claim as new and desire to secure by Letters Patent is:—

1. A band brake consisting of a supporting bar, two spring-acting semicircular members having ears at one end which extend over the opposite sides of said supporting bar, the engaging faces of the ears and bar being inclined one with relation to the other in opposite ways at opposite sides of the bar whereby said members are divergingly disposed with respect to the bar, means for rigidly securing said ears to the bar, and means engaging the opposite ends of said members to draw said members toward each other against their inherent tendency to separate, substantially as described.

2. A band brake consisting of a supporting bar having a pair of oppositely disposed parallel engaging faces, two spring acting semicircular members having ears at one end formed with oppositely inclined engaging faces which extend over the engaging faces of the supporting bar, a bolt extending through said ears and bar for rigidly attaching the semicircular members to the bar, and means engaging the opposite ends of said members to draw them toward each other against their inherent tendency to separate, substantially as described.

3. A band brake consisting of a supporting bar, two spring acting semicircular members rigidly secured at one end to said bar and diverging therefrom and having ears at their opposite ends, a bolt extended through said ears, a nut turned on the end of said bolt engaging one of said ears, an arm mounted on the other end of said bolt between the head thereof and the other ear, said arm and the adjacent ear each having a cam-faced boss which engage each other, whereby movement of the arm draws the bolt in one direction and moves the adjacent ear in the opposite direction, to thereby draw the two semicircular members toward each other, and means for moving said arm, substantially as described.

4. A band brake consisting of a supporting bar, two spring acting semicircular members rigidly secured at one end to said bar and diverging therefrom and having ears at their opposite ends, a bolt extended through said ears, a nut turned on one end of said bolt engaging one of said ears, an arm mounted on the other end of said bolt between the head thereof and the other ear, said arm and the adjacent ear each having a cam faced boss which engage each other, whereby movement of the arm draws the bolt in one direction and moves the adjacent ear in the opposite direction to thereby draw the two semicircular members toward each other, an actuating lever pivotally connected to the aforesaid supporting bar, and a link connecting said actuating lever with said arm, substantially as described.

5. A band-brake comprising two semicircular members having outwardly extended ears at their opposite ends, means engaging the ears at one end of said members for supporting said members, a bolt extended through the ears at the opposite ends of said members, an arm mounted on said bolt between the head thereof and one of said ears, said arm and the adjacent ear each having a cam-faced boss which engage each other, the cams thereon each having a quick rise and a slow rise in continuation and also having a depressed portion substantially equal in length to twice the length of both the quick and slow rises, substantially as described.

6. A band-brake consisting of a supporting-bar, two spring-acting semicircular members rigidly secured at one end to said bar and diverging therefrom, means engaging the opposite ends of said members to draw them toward each other against their inherent tendency to separate, and outwardly extended lugs arranged on said members which engage supports and thereby support the weight of the band-brake when the members thereof are moved into disengaging positions, substantially as described.

In testimony whereof, I have signed my name to this specification, in the presence of two subscribing witnesses.

HENRY A. TUTTLE.

Witnesses:
B. J. NOYES,
H. B. DAVIS.